C. A. SATTLEY.
CORN HARVESTING MACHINE.
APPLICATION FILED OCT. 26, 1911.
1,030,615.
Patented June 25, 1912.
4 SHEETS—SHEET 1.
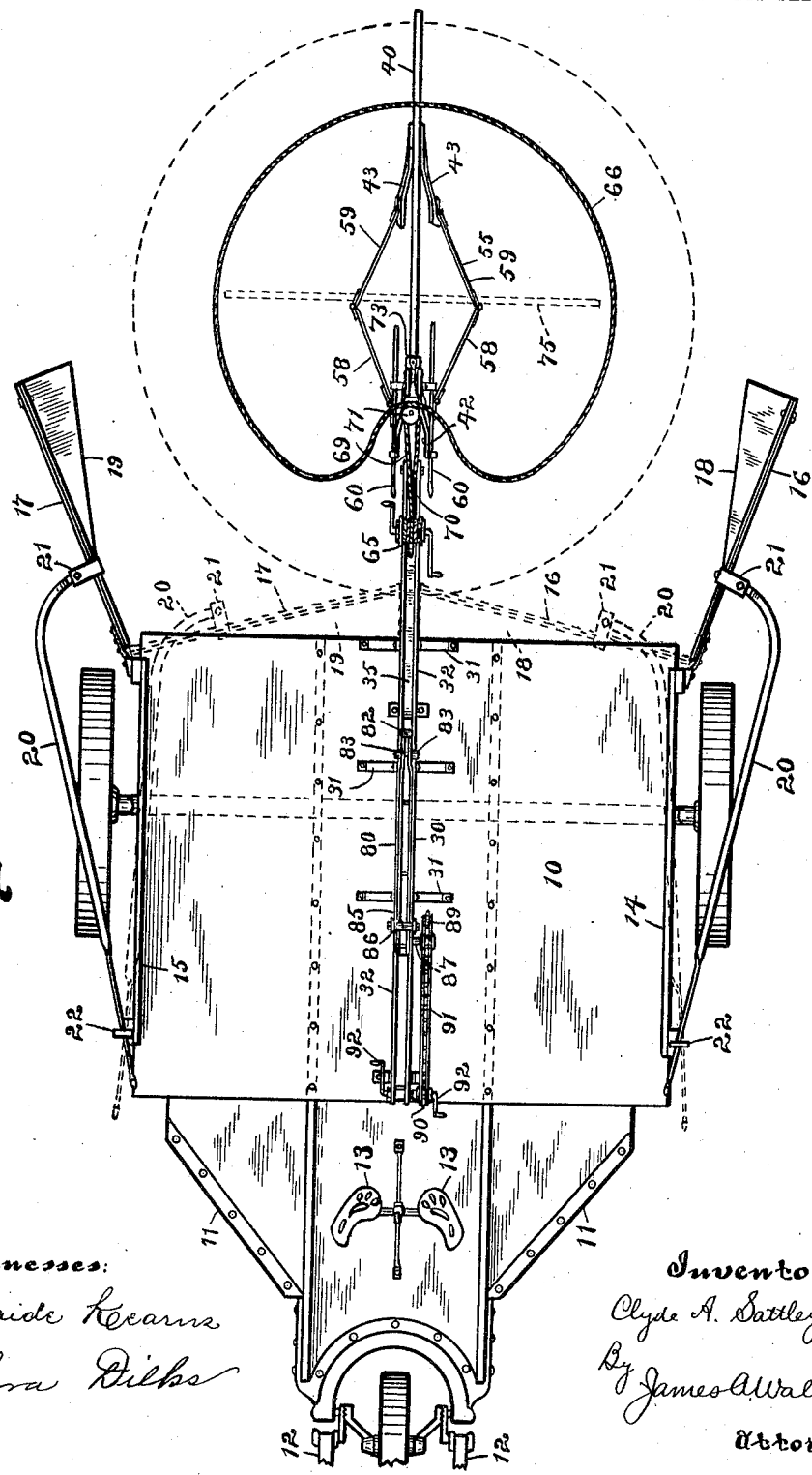

C. A. SATTLEY.
CORN HARVESTING MACHINE.
APPLICATION FILED OCT. 26, 1911.
1,030,615.
Patented June 25, 1912.
4 SHEETS—SHEET 2.
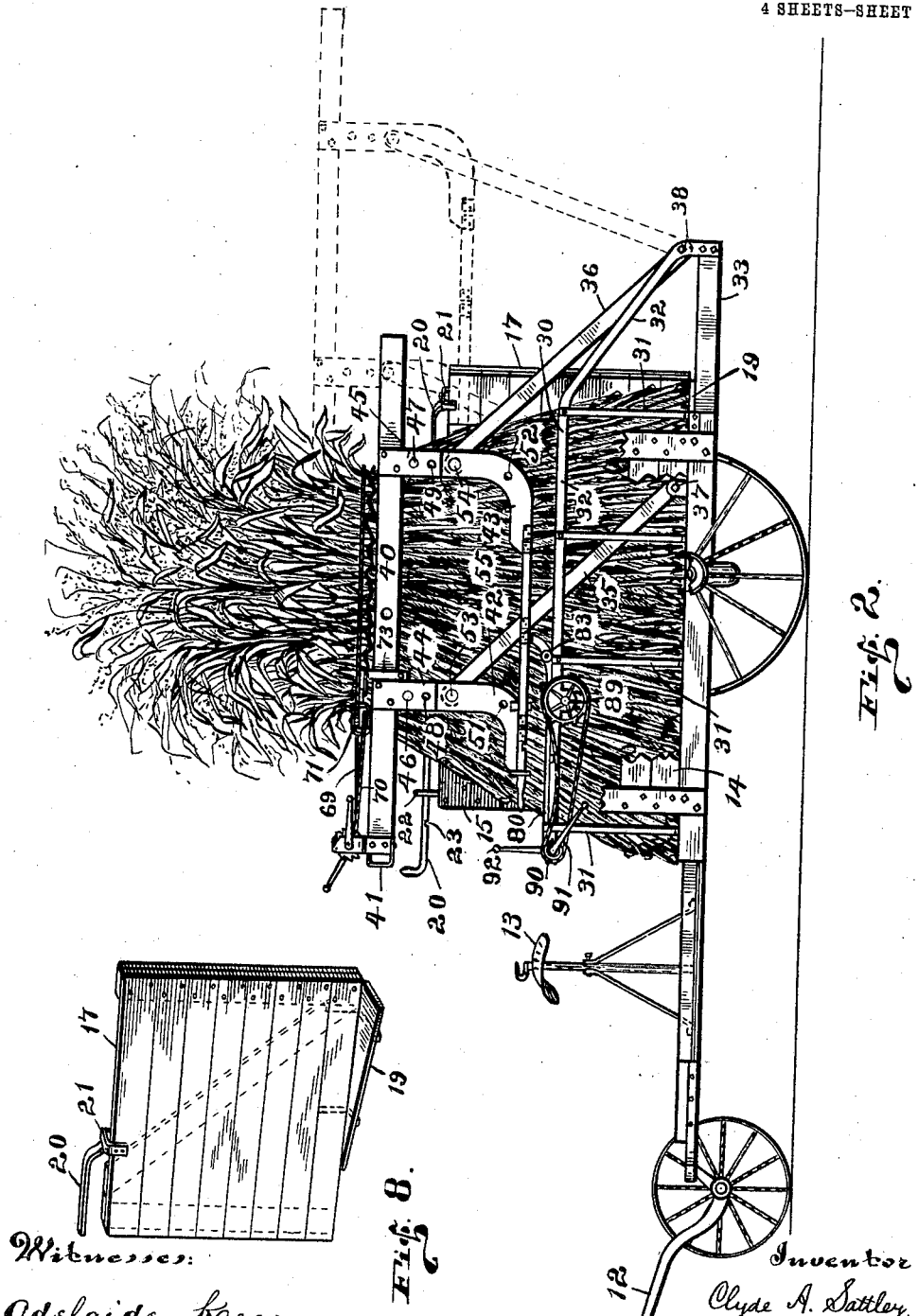

C. A. SATTLEY.
CORN HARVESTING MACHINE.
APPLICATION FILED OCT. 26, 1911.
1,030,615.
Patented June 25, 1912.
4 SHEETS—SHEET 3.
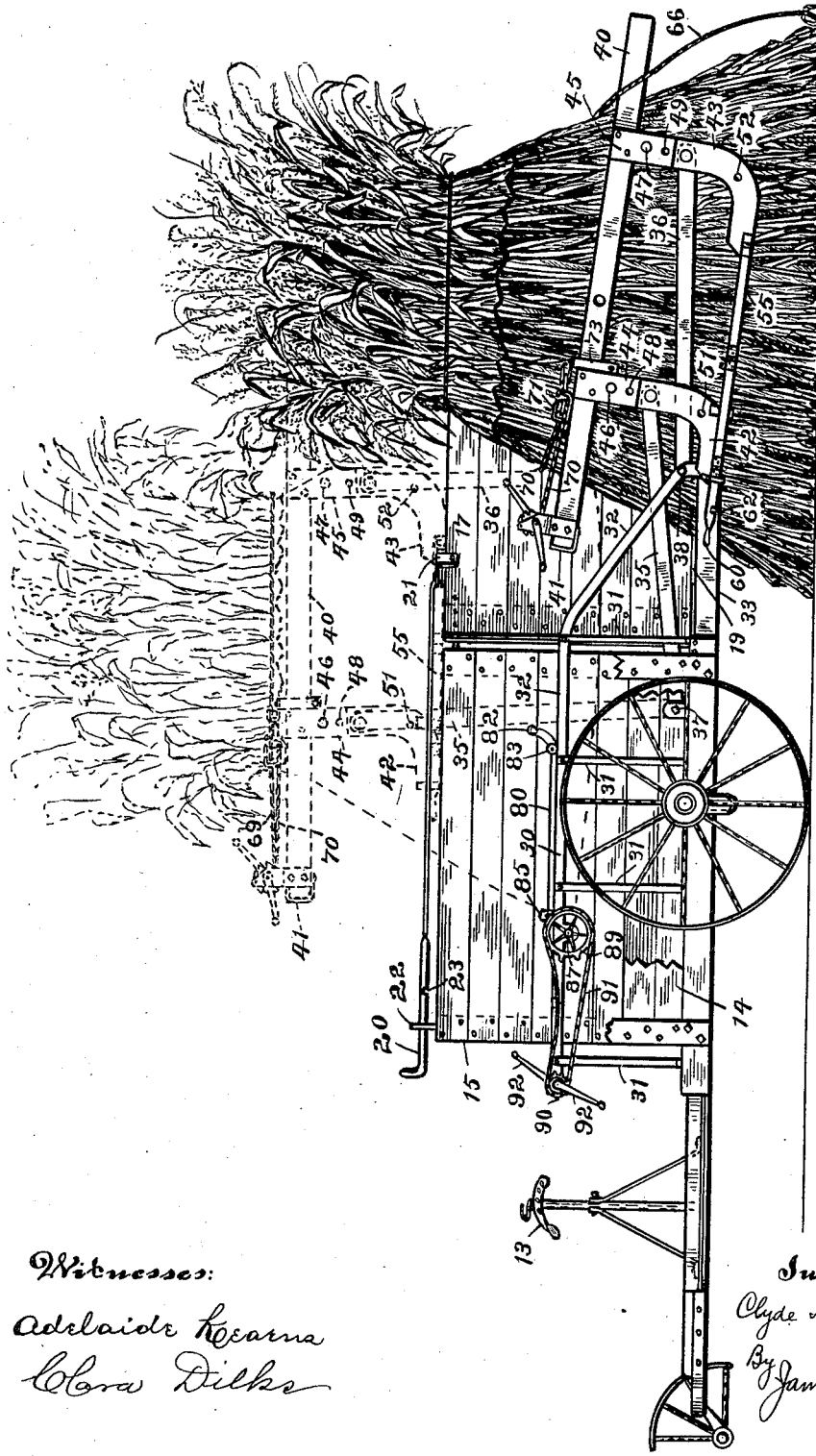

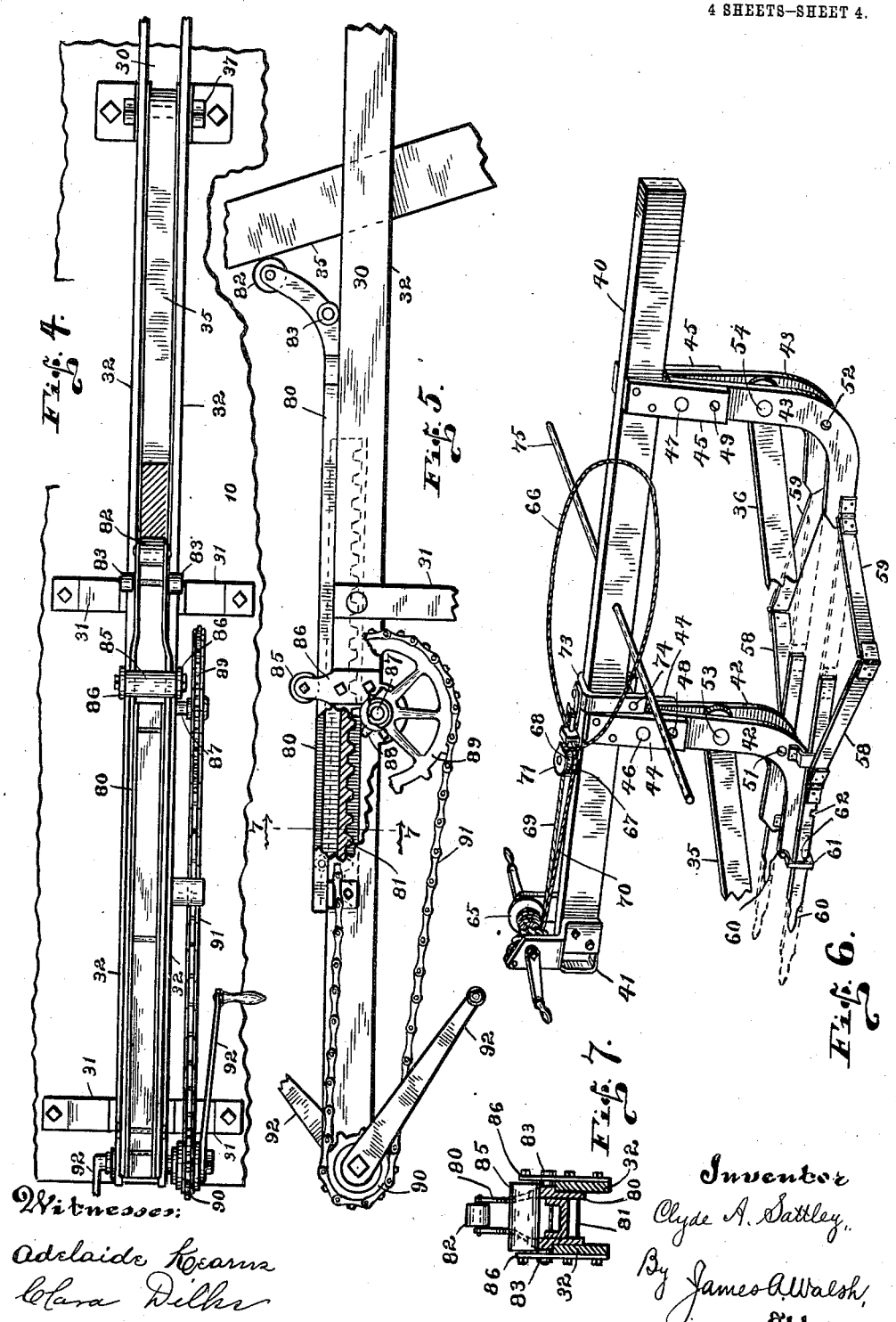

UNITED STATES PATENT OFFICE.

CLYDE A. SATTLEY, OF INDIANAPOLIS, INDIANA, ASSIGNOR TO SATTLEY MACHINERY COMPANY, OF INDIANAPOLIS, INDIANA, A CORPORATION OF MAINE.

CORN-HARVESTING MACHINE.

1,030,615.  Specification of Letters Patent.  Patented June 25, 1912.

Application filed October 26, 1911. Serial No. 656,877.

*To all whom it may concern:*

Be it known that I, CLYDE A. SATTLEY, a citizen of the United States, residing at Indianapolis, in the county of Marion and State of Indiana, have invented certain new and useful Improvements in Corn-Harvesting Machines, of which the following is a specification.

The object of my invention is to provide a simple and efficient machine for cutting and shocking corn in the field, by which I am enabled as the stalks are being cut to place the same on a platform in vertical position so arranged as to form a shock of a hollow and flared formation at its base and compact through its upper portion, and which can be quickly and easily raised from the platform and deposited upon the ground in upstanding position.

In carrying out my invention I employ appropriate cutting devices in connection with my improved shocking mechanism, and mount the same upon wheels, producing a machine of light draft requiring the services of but a single animal, the stalks can be quickly cut and placed on the platform thereof and formed into a shock which may be readily compressed, raised from the platform and deposited upon the ground without varying its vertical position, and by working through two rows of corn, as I prefer, a predetermined number of stalks can be cut for each shock, so that the shocks will be substantially uniform in size. I am also enabled, if desired, to deposit the shocks in regular order closely together in rows through the field, the rows being a considerable distance apart (approximately two hundred and fifty feet), so that a cleared regular space is left between them, which is of material advantage in sowing wheat before the removal of the corn crop as is commonly done, as under ordinary conditions where hand cutting and shocking are employed the shocks are so positioned (usually about forty feet apart) as to necessitate driving around and between them when sowing wheat, the result being that much ground space is lost for seeding because of the impracticability of driving closely to, and uniformly following the contour of, a shock with seeding machinery.

In the accompanying drawings, which form a part hereof, Figure 1 is a plan of my improved harvester, the circular dotted line indicating the position of a corn shock when deposited upon the ground; Fig. 2, a side elevation, the side wall of the machine and a corn shock being shown in fragment to more clearly indicate my improved shock discharger, its position when propelled rearwardly being indicated by dotted lines; Fig. 3, a side elevation showing the relations of the shock discharger to a shock after the latter has been deposited upon the ground, the position of said discharger and shock as they are being propelled being indicated in dotted lines; Fig. 4, a detail plan of the means for propelling the discharger from normal to depositing position; Fig. 5, a side elevation of the same; Fig. 6, a perspective of the shock discharger; Fig. 7, a detail sectional view of the discharger propelling means as seen when looking in the direction indicated by the arrows 7—7 in Fig. 5; and Fig. 8 a perspective of a gate which I employ at the delivery end of the machine.

In said drawings the portions marked 10 indicate a wheeled platform, the forward end of which is provided with suitable cutting devices, those shown for illustration being angularly arranged knives 11 each designed to cut a standing row of stalks as the machine is advanced through the field, suitable provision, such as a pair of shafts 12 or otherwise, being provided for the attachment of an animal, and a rest or seats 13 may also be arranged on the platform for the use of operators while handling cut corn stalks. Said platform is provided with inclosing walls such as 14, 15, and an end wall, the latter being in the form of gates, 16, 17, each of which may be provided with a ledge, 18, 19, adapted, when the gates are closed, to form an extension to the platform 10 as indicated by dotted lines in Fig. 1. Said gates are preferably duplicates hinged in any appropriate manner to the side walls, and may be opened and closed by an operator at the cutting end of the machine by means of a rod 20 pivotally connected to the gate, at 21, and curved substantially in the manner indicated, being held in position at its forward end by a bracket 22, said rod having notches, as 23, which engage said bracket and by which the gate is fixedly held in position, the rod, as will be understood, being so arranged as to be readily raised for releasing the same from the bracket when operating the gate, the position of the rods and gates when the latter are closed being indicated in dotted lines in Fig. 1. Mounted upon said platform 10 is a guide 30 extending longitudinally of the machine comprising suitable supports, as standards 31, and rails 32, which latter terminate preferably beyond the rear edge of said platform and are connected to a sill 33 as indicated in Fig. 2. In said guide 30 I mount a shock discharger comprising swinging links 35, 36, which are pivotally connected to said platform structure at 37, 38, respectively, to the upper end of which links is connected a discharger-bar 40 by means of depending members as 42, 43, which I have shown as having adjustable sections 44, 45, so that said bar may be raised or lowered as desired and held in position by inserting pins 46, 47, through openings 48, 49, by which arrangement the discharger may be adjusted to support corn stalks of varying lengths. Said discharger-bar 40 is provided with a hand-hold 41 for use of an operator when manipulating the shock discharger. I am further enabled to enlarge the range of adjustment of said discharger by providing openings 51, 52, in said members 42, 43, at which points said members may be connected to the upper ends of the links by the pins 53, 54. I also associate with said discharger a shock spreader 55 (Fig. 1), preferably connecting the same to said members 42, 43, in substantially the manner indicated in Fig. 6. Said spreader 55 may be of any appropriate form and construction to be readily withdrawn through the side of a shock, and open at its ends as indicated in Fig. 6 so that the links 35, 36, will pass through the same when the discharger as a whole is shifted to its various positions, that shown being diamond-shaped and collapsible, comprising hinged members 58, 59, the members 58 having forward extensions terminating in handles 60 mounted in brackets 61, said handles being provided with notches 62, which engage said brackets, thereby fixedly holding said spreader in distended or collapsed condition as desired, the position of said spreader parts when collapsed being indicated by dotted lines in Fig. 6. Said discharger is also provided with a shock compressor, which I prefer to mount upon discharger-bar 40, and which comprises a suitable windlass to the drum 65 of which I secure a shock compressing cord or rope which I pass about one of a double set of pulleys, as 67, thence around a shock and then about an open-faced pulley 68 to form a noose 66 (Fig. 6), its loose end 69 being laid across the portion 70 under the drum 65 so that when the latter is rotated said end 69 will be gripped by the portion 70 and both ends thus simultaneously wound. Said pulleys 67, 68, are arranged one above another and are held in a suitable casing 71 which is connected to a clip 73 mounted upon bar 40, and which is movably and slidably held thereon by a pin 74, so that said parts may be moved rearwardly or forwardly along said bar in order to insure that said pulleys will be close to the shock and in proper relation thereto when compressing the same. Said bar 40 is provided with a transverse member or divider, which I have illustrated in the form of a rod or pin 75 (Fig. 6) designed to be inserted through said bar about midway its length to form corners in which to stand stalks, said rod being approximately in the same vertical plane as the middle or widest portion of the spreader 55.

Secured to the guide composed of rails 32, and preferably at its forward end, is a propeller which contacts with said shock discharger to propel the same rearwardly when depositing a shock, and for arresting the movement of said discharger when returning it to normal position. Said propeller comprises a member 80 provided with a rack-bar 81 on its under side, and arranged to travel between guide rails 32, the forward end of said member 80 having a roller 82 which contacts with link 35 of the shock discharger, and trucks 83 at its sides which travel along the top of rails 32. Said member 80 is held in position between said rails 32 by an idler 85 suitably secured, as by standards 86, to the sides of said rails. Also secured to said rails is a shaft 87 upon which is mounted a pinion 88 which engages the teeth 81 of said propeller, and which shaft carries a sprocket 89 which is connected to a sprocket 90 at the end of said rails 32 by a chain 91, said sprocket 90 being provided with cranks 92 for operating the same and actuating said propeller.

In operation, my improved corn harvester is drawn through two rows of corn, and, as the machine advances, the stalks in each row are cut by the knives 11. An operator stands on the platform near each knife and grasps the cut stalks, and upon the accumulation of a sufficient bundle the machine is stopped, when each operator places the stalks in upright position upon each side of the shock discharger, arranging the stalks first at the rear of the platform and behind the divider and then building the shock forwardly and from the side walls of the machine and at the front side of the divider and inclining the stalks inwardly in the corners formed by the divider and discharger-bar. During this part of the operation the gates 16, 17, are closed, the ledges thereof forming an extension to the platform for supporting a portion of the shock, which portion projects beyond the edge of the platform when the gates are opened, so that by the removal of such extension the shock supporting platform is to that extent shortened, which arrangement provides ample clearance for the front side of the shock when it is being discharged. The shock discharger is in the position indicated in Fig. 2, the dividing rod 75 having been inserted through bar 40, said rod being about midway of said bar, and, as hereinbefore indicated, approximately in the same vertical plane as the widened portion of spreader 55. The relation of said rod to the bar and spreader is plainly indicated in Fig. 1, the rod being shown in dotted lines, but it will be understood that in practice said rod is removed from the bar before the shock is compressed and deposited. It is essential that a corn shock be of tapered formation, that is, considerably wider at its base than at its top and compact through its upper portion, so that it will withstand the winds and shed rain and snow, and also that it be hollow to a considerable extent in its middle at the base to permit circulation of the air through the mass of stalks for properly curing the same. Therefore in building a shock the stalks are placed against spreader 55 and in the corners formed by bar 40 and the transverse rod or divider 75, and in this manner are caused to incline from the butt ends inwardly toward said bar and divider and thus become centralized, and, as the shock in this manner is practically built in quarter sections, each section being supported by said bar and divider, the weight of the entire mass is equally distributed about the discharger, and shifting or falling apart of the completed shock is obviated. When sufficient stalks have been so arranged to form a shock of the desired size such shock will be of substantially the form shown in Fig. 2, its base being flared and approximately covering platform 10 and the ledges 18, 19, of the gates. I then draw the end 69 of compressing rope about the shock immediately above discharger bar 40, passing the same through open faced pulley 68, and lay said end upon portion 70 at the point where it leaves the winding drum 65 of the windlass, and by slightly rotating said drum said end 69 is gripped and held by said other rope portion. At this step in the operation the shock is in somewhat loose condition so that the noose 66 of the rope is in substantially the form shown in Fig. 1. The rod 75 is then removed and the windlass is operated, and, as the drum thereof is rotated, both ends of the rope are simultaneously and equally wound thereon, the result being that said noose is gradually brought to circular form as shown in Fig. 6, because of its meeting portions being controlled at substantially the same point by the pulleys 67, 68, the forward portion of the shock mass being brought to proper position during such compression uniformly with the remaining portions of the shock. By so tightening the noose after the removal of the rod 75 the shock is securely bound to the discharger just above bar 40 and compacted through its upper portion, and as it is tightly compressed at that portion the lower or butt portions of the stalks spread outwardly slightly against the retaining walls of the machine. The shock is then bound in the ordinary way near its top by twine or otherwise, and is in position to be deposited upon the ground, which operation is accomplished in the following manner: The gates 18, 19, are opened, as indicated in Fig. 1, by manipulating rods 20, and an operator rotates sprocket 90 by a crank 92, which causes pinion 88 to advance propeller 80, which, bearing against link 35 by its roller 82, forces said link and the entire shock discharger and shock upwardly as indicated by dotted lines in Fig. 3, and rearwardly until the carrier links 35 and 36 pass their pivotal connections when by gravity the shock with its carrier plunges to the ground, during which movement from machine to the ground the spreader moves with the shock and maintains the same relative position to bar 40 and the shock throughout the movement of the discharger, while at the same time the shock occupies a constant vertical position for the reason that the discharger bar being pivotally connected to the links maintains its horizontal position at all times during the entire swinging movement of said links. The compressing rope is then released and the bar 40 is pushed downwardly, the discharger through the links being of a yielding character, so that spreader 55 may be released from its grip by the stalks and be positioned in the hollow portion of the shock close to the ground. The spreader is then collapsed by pulling forwardly on its handle 60, and the machine continued on its advancement through the rows, the shock discharger and spreader being readily pulled transversely through the side of the shock by the movement of the machine, when said discharger is thrown upwardly and forwardly until link 35 contacts with propeller roller 82, which arrests the rapid movement of the shock discharger, and the weight of said discharger automatically drives said propeller forwardly until said mechanisms reach normal position as shown in Fig. 2. The gates are then closed and the cutting, shocking and depositing operations are proceeded with in the manner described.

Although I have shown and described a collapsible stalk spreader, I do not desire to be understood as limiting myself to such an arrangement, as in actual use in the field I have demonstrated that a non-collapsible spreader may be readily pulled through the wall of a shock by the machine when the same is advanced without disarranging the shock. It will be understood also that corn stalks are not uniform in character nor length, being found in different conditions in the same locality, and therefore, where unusually long stalks are present it is advantageous to place the shock discharger-bar, or the discharger and spreader, in higher position, and by making these mechanisms adjustable, substantially as in the manner hereinbefore indicated, I am enabled to readily adapt my improved harvester to such varying conditions, although in average sized corn I have found in practice that my shock discharger arrangement as shown meets all requirements.

As is clearly indicated in the drawings, my combined shock discharger, spreader and compressor occupy but a comparatively small space on the platform of the machine, and said discharger being arranged in the manner set forth is simply operable and durable; a shock can be readily and properly formed, hollowed and flared at the base, and compressed about the discharger so that its upper portion will be compacted, and quickly elevated from the machine and deposited upon the ground in condition to be self supporting, and which said mechanisms may be readily released through the side of the shock without affecting its stability.

I claim as my invention:

1. A corn harvesting machine comprising a platform, inclosing walls at opposite sides of the same, gates at the rear end thereof, means for opening and closing said gates, a shock discharger embodying a stalk spreader mounted upon said platform and adapted to be moved rearwardly beyond the edge of said platform and returned to shock building position, means associated with said discharger for securing a shock thereto, and means for propelling said discharger to lift a shock from said platform and deposit the same on the ground behind said machine and for arresting the movement of said discharger as it is being returned to shock building position.

2. A corn harvesting machine comprising a frame, a shock retaining wall thereon, a gate associated with said wall, means for opening and closing said gate, a shock discharger embodying a stalk spreader mounted to swing longitudinally on said frame, and means for actuating said discharger to lift a shock from said frame and deposit the same on the ground behind said machine.

3. The combination, in a corn harvesting machine, of a frame, and a shock discharger mounted thereon comprising a pivoted bar, means arranged transversely of said bar for dividing stalks, stalk spreading means associated with said discharger and positioned below said dividing means, a windlass on said bar, and a cord attached to said windlass and adapted to encircle and compress a shock.

4. In a corn harvesting machine, a shock discharger comprising a pivoted member adapted to shift longitudinally of said machine, a stalk spreader communicating with and positioned below said pivoted member, means associated with said discharger for securing a shock thereto, and means for propelling said discharger and spreader rearwardly to deposit a shock on the ground.

5. The combination, with a corn harvesting machine, of a shock discharger embodying a stalk spreader and means for securing a shock thereto, a propeller embodying a roller adapted to contact with said discharger, and means for actuating said propeller to advance said discharger from normal to shock depositing position.

6. The combination, with a corn harvesting machine, of a shock discharger embodying a stalk spreader and means for securing a shock thereto, a propeller adapted to contact with said discharger, means for actuating said propeller to force said discharger rearwardly and to follow the same during a portion of its movement and to be returned to normal position by said discharger when the movement of the latter is reversed.

7. In a corn harvesting machine, the combination of a platform provided with retaining walls, gates at the ends of said walls adapted to be closed when building a shock, a rearwardly movable discharger embodying stalk spreading means about which a shock is formed mounted on said platform, means associated with said discharger for binding a shock thereto, means for opening said gates, and means for propelling said discharger beyond the rear end of said machine when depositing a shock.

8. In a corn harvesting machine, the combination of a frame having side and end walls for retaining stalks thereon, a guide mounted thereon, a link communicating with said frame and adapted to travel through said guide, a discharger-bar communicating with said link, a spreader communicating with said bar, means for securing a shock to said bar, and means for propelling said link to drive said bar rearwardly to deposit a shock on the ground.

9. In a corn harvesting machine, means about which a shock is formed, elevated and discharged, comprising a horizontally arranged bar having members dependent therefrom, stalk spreading means associated with said members, and swinging links communicating with said members and said machine whereby said shock forming and discharging means as a whole may be shifted rearwardly and forwardly of said machine.

10. In a corn harvesting machine, the combination with a shock discharger embodying means for spreading stalks, of a shock compressor comprising cord-winding means, a cord secured at one end to said winding means, a pulley about which said cord is run to encircle a shock, and a pulley adjacent said first mentioned pulley about which the opposite end of said cord is passed and thence returned to said winding means whereby when said winding means is rotated both ends of said cord are simultaneously wound thereon and the noose of said rope uniformly decreased in size gradually to compress a shock in circular form.

11. In a corn harvesting machine, the combination with a shock discharger embodying means for spreading stalks, of a shock compressor associated therewith comprising winding mechanism, a cord running from and returning to said winding mechanism to form a loop for encircling a shock, guiding means on said discharger through which said cord passes, and means for shifting said guiding means on said discharger.

12. In a corn harvesting machine, the combination, with a shock discharger embodying means for spreading stalks, of shock compressing means associated therewith comprising winding mechanism, a cord running from and returning to said winding mechanism to form a shock-encircling loop, and pulleys through which said rope is guided said pulleys being so positioned on said discharger as to contact with a shock at its circumference.

13. In a corn harvesting machine, the combination, with a shock discharger embodying means for spreading stalks, of shock compressing means associated therewith comprising winding mechanism, a cord running from and returning to said winding mechanism to form a shock encircling loop, and pulleys through which said rope is guided said pulleys being so positioned on said discharger as to be within the circumference of the stalk mass before compression thereof and to contact with the shock substantially at its circumference when compressed.

14. A corn harvesting machine comprising a frame having side and end stalk retaining walls, a shock discharger embodying a stalk spreader about which a shock is formed mounted on said frame and adapted to be shifted rearwardly and forwardly thereon, means for propelling said discharger rearwardly, and means for arresting the forward movement of said discharger in its return to normal position on said frame.

15. In a corn harvesting machine comprising a frame having side and end stalk retaining walls, a movable shock discharger embodying a spreader about which a shock is formed, a guide within which said discharger travels, a propeller associated with said guide, and means for actuating said propeller along said guide to shift said discharger.

16. In a corn harvesting machine comprising a frame having side and end stalk retaining walls, a movable shock discharger embodying stalk spreading means about which a shock is formed mounted thereon, said discharger being adapted to lift a corn shock from said frame and deposit the same beyond the rear edge thereof upon the ground, a guide within which said discharger travels, means associated with said guide for propelling said discharger comprising a rack-bar, and means engaging said rack-bar for actuating the same.

17. In a corn harvesting machine comprising a frame having side and end stalk retaining walls, a longitudinally movable shock discharger embodying a stalk spreader about which a shock is formed, a removable transverse member in said discharger forming four corners in which stalks are positioned, means for compressing a shock about said discharger, and means for propelling said discharger together with said compressing means rearwardly toward the ground.

18. The combination, in a corn harvesting machine, of a discharger about which a shock is formed, means for compressing a shock about said discharger, means associated with said discharger for spreading stalks at the base of the shock, and means for propelling said discharger together with a shock from said machine to the ground, said discharger and spreading means being withdrawn transversely through the side of a shock by the advancement of the machine.

19. The combination, in a corn harvesting machine, of a frame, shock-retaining walls mounted thereon, gates at one end of said machine for retaining shocks, a shock discharger mounted on said frame and about which a shock is formed, means for propelling said discharger and a shock rearwardly from the machine, and means for operating said gates to permit the discharge of a shock from the machine.

20. The combination, in a corn harvesting machine, of a platform, shock retaining walls associated therewith, a gate at one end of said machine comprising a projection adapted when said gate is closed to form an extension to said platform, means for operating said gate, a shock discharger embodying a spreader mounted on said platform about which a shock may be formed and secured, and means for actuating said discharger to convey a shock therefrom.

21. In a corn harvesting machine, a shock discharger comprising a pivotally mounted horizontally arranged bar, a shock spreader associated therewith, and a divider arranged transversely of said discharger and in approximately the same vertical plane with said spreader whereby a stalk mass may be centralized about said discharger in compact condition at its upper end and hollow at its lower end.

22. In a corn harvesting machine, the combination of a platform, a shock discharger movably mounted thereon comprising a pivotally mounted horizontally arranged bar, a stalk spreader associated and movable therewith, means for compressing a shock about said discharger, stalk-dividing means adapted to be arranged transversely of said discharger for supporting stalks while a shock is being constructed and displaced from such position when compressing the shock, and means for shifting said discharger from shock building to shock depositing positions.

23. In a corn harvesting machine, the combination of shock discharging mechanism comprising a pivotally mounted horizontally arranged bar and a removable stalk dividing member about which a shock is formed, means associated therewith for spreading stalks at the butt end of the shock while the same is being constructed, and means for actuating said discharging mechanism to deposit a shock upon the ground said spreading means maintaining its co-ordinate relation with said discharging mechanism during such operation.

24. In a corn harvesting machine, a shock discharger comprising a horizontally-arranged bar, stalk spreading means associated therewith, means communicating with said bar by which the same and its spreading means may be shifted rearwardly and forwardly of the machine, and means for adjusting said spreading means to different positions to accommodate corn stalks of varying lengths.

25. The combination, with a corn harvester, of a shock discharger comprising swinging links, a bar, means dependent from said bar for connecting the same to said links, and a spreader associated with said connecting means adapted to retain the same relation to said discharger when in normal or shock depositing positions.

26. In a corn harvesting machine, the combination of a platform, a horizontally arranged discharger bar, movable means connecting said platform and said bar, means associated with said bar for spreading stalks at the butt end of the shock while constructing and discharging the same, means for binding a shock to said bar, and means for actuating said bar with its spreading means to elevate said shock from said platform and deposit the same upon the ground said shock during such movement maintaining a constant vertical position.

27. In a corn harvesting machine, a movable shock discharger mounted thereon, a transverse member associated with said discharger substantially midway of its length and forming corners at its front and rear sides in which a shock is built in sections, means for spreading the shock at its butt end during the course of construction, means for compressing the shock about said discharger, and means for propelling said discharger together with said compressing and spreading means when depositing a shock.

28. In a corn harvesting machine, the combination, with a shock discharger comprising a pivotally mounted horizontally arranged bar adapted to be actuated rearwardly and forwardly on said machine and about which a shock is formed, of means for hollowing and spreading the butt end of a shock, a portion of said spreading means extending beyond the vertical plane of said discharger and tapering forwardly to permit the ready withdrawal of said discharger and spreading means through the side of a shock when said machine is advanced.

29. In a corn harvesting machine, a shock discharger comprising a pivotally mounted horizontally arranged bar and a stalk spreader therebeneath and communicating therewith about which a shock is formed, means arranged transversely of said discharger approximately in the same vertical plane with its spreader, whereby a stalk mass may be arranged in quarter sections about said discharger and spreader in compact condition at its upper end and hollow and flared at its lower end, means associated with said discharger for compressing a shock, and means for propelling said discharger rearwardly to deposit a shock upon the ground, said discharger and spreader being withdrawn transversely through the side of the shock by the machine when advanced.

30. In a corn harvesting machine, the combination, with a shock discharger comprising a pivotally mounted horizontally arranged bar adapted to be swung rearwardly and forwardly on said machine about which a shock is formed, of a stalk spreader wider at approximately its middle portion than said discharger and so positioned in relation thereto as to occupy the middle portion of a shock and maintain the same in hollow and flared condition near its base during the construction and deposit thereof, and means for propelling said discharger, spreader and shock from the machine to deposit said shock upon the ground, said discharger being mounted to permit the downward movement of the same with its spreader through the hollow portion of the shock and the withdrawal thereof through the side of the shock.

31. A corn harvesting machine comprising a platform; stalk retaining walls thereon; a guide mounted on said platform; a shock discharger comprising a bar, stalk spreader and shock compressor mounted on said platform in said guide; means for propelling said discharger mounted in said guide and adapted to travel therealong; and means associated with said guide for actuating said propelling means to drive said discharger rearwardly to shock depositing position.

32. In a corn harvesting machine, the combination of a frame, a link communicating therewith, a discharger-bar communicating with said link, an open-ended spreader communicating with said bar, and means for propelling said link through said spreader to shift said bar and spreader rearwardly to deposit a shock on the ground.

33. The combination, with a corn harvesting machine, of a shock discharger comprising swinging links, a bar, means dependent from said bar for connecting the same to said links, and an open-ended spreader associated with said connecting means through which said links may pass when actuated to shift said bar to and from shock building and discharging positions.

34. In a corn harvesting machine, the combination, with a shock-discharging bar adapted to be actuated rearwardly and forwardly on said machine, of means for hollowing and spreading the butt end of a shock, said spreading means being open-ended and a portion thereof extending beyond the vertical plane of said bar and tapered to permit the withdrawal of said discharger and spreading means through the side of a shock when said machine is advanced.

In testimony whereof I affix my signature in presence of two witnesses.

CLYDE A. SATTLEY.

Witnesses:
 J. A. WALSH,
 F. L. SATTLEY.

---

Copies of this patent may be obtained for five cents each, by addressing the "Commissioner of Patents, Washington, D. C."